April 15, 1952 G. H. SCHANZ 2,592,958
APPARATUS FOR HANDLING STRIP MATERIAL FROM EXTRUDING MACHINES
Filed Sept. 20, 1948 4 Sheets-Sheet 1

Inventor
George H. Schanz
By
Atty.

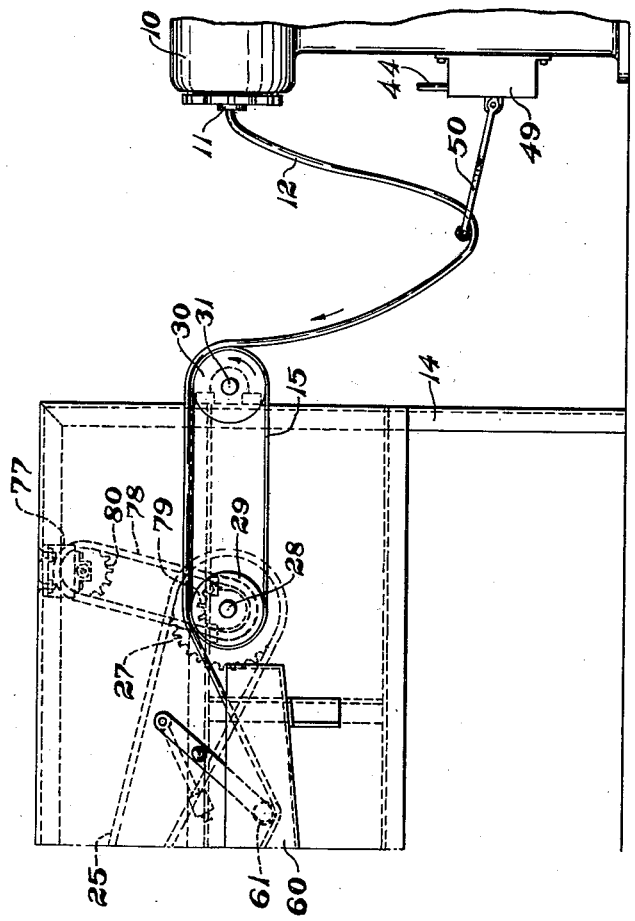

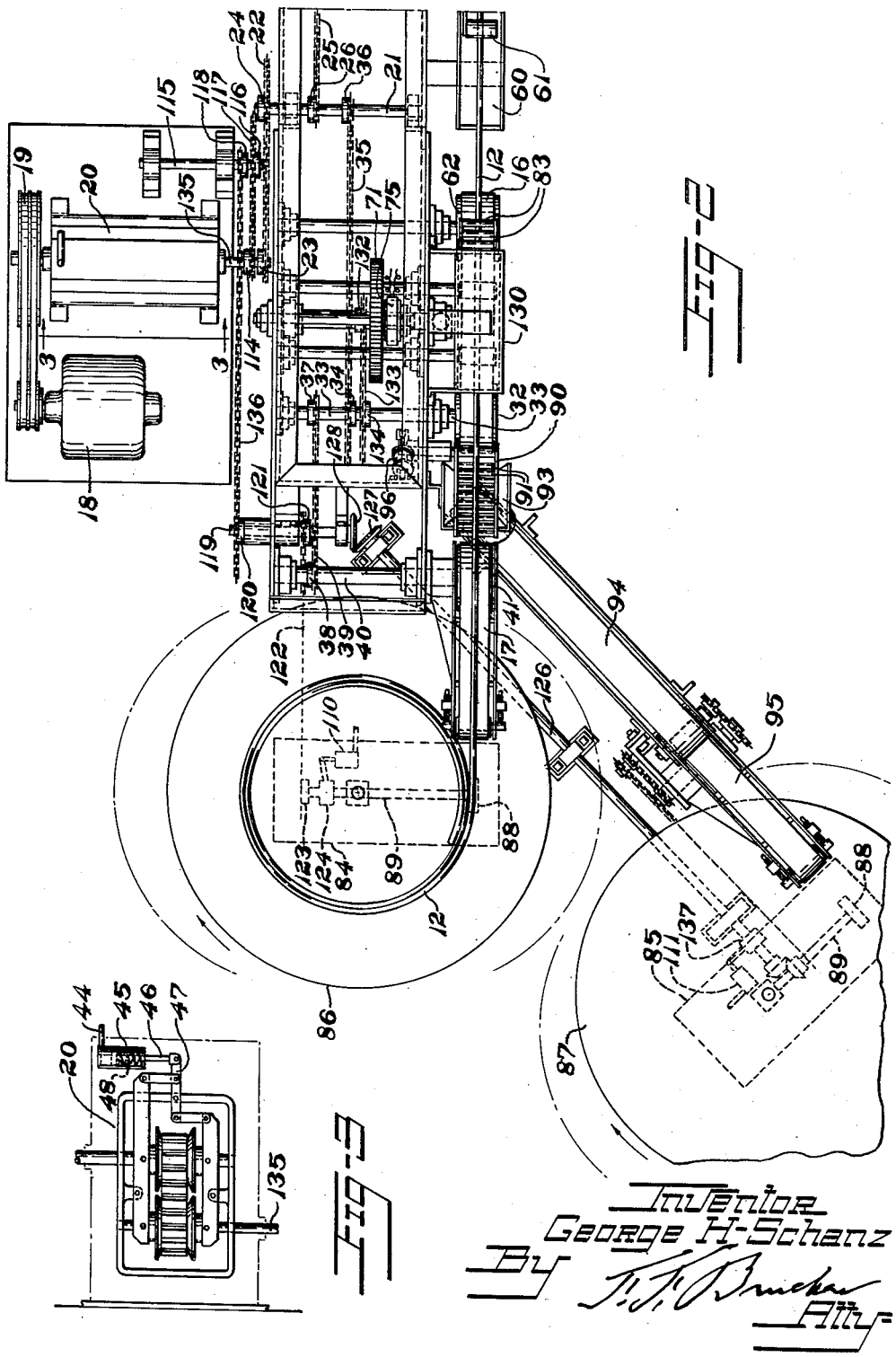

April 15, 1952     G. H. SCHANZ     2,592,958
APPARATUS FOR HANDLING STRIP MATERIAL FROM EXTRUDING MACHINES
Filed Sept. 20, 1948     4 Sheets-Sheet 4

Inventor
George H. Schanz

Patented Apr. 15, 1952

2,592,958

UNITED STATES PATENT OFFICE 2,592,958

APPARATUS FOR HANDLING STRIP MATERIAL FROM EXTRUDING MACHINES

George H. Schanz, Akron, Ohio, assignor to The B. F. Goodrich Company, New York, N. Y., a corporation of New York Application September 20, 1948, Serial No. 50,085

4 Claims. (Cl. 242—80)

This invention relates to apparatus for handling strip material from an extruding machine, and is especially useful in handling hose linings or other tubular material as it issues from the extruding machine. The invention is an improvement of the apparatus shown in the patent of Edward A. Davis, No. 2,309,755.

In the manufacture of rubber lined braided hose an unvulcanized composition in plastic form has been extruded to provide a tubular strip of material and has been coiled on trays after being coated with soapstone powder or other separating material to prevent sticking of the adjacent coils to each other. The trays loaded with the coiled strip have then been stored to permit cooling of the strip. Thereafter the strip material has been withdrawn from the trays and passed through braiding or other covering machines to apply a textile covering thereto. As the hose must be made up in standard lengths, a great amount of waste ordinarily results if the lengths of coiled material on the trays are either shorter or considerably longer than the desired lengths of hose, as in the case of the tube being too short it must be discarded before covering or the resulting length of hose will be under the desired length, and if too long the excessive length of tube must be cut away and discarded. As the extruded tube advances rapidly from the extruding machine to the coiling table, it has been difficult to measure and cut the tube to proper length.

The trays to support the coiled tube are in the form of round discs and have been supported for coiling purposes on a power driven table. Heretofore, when a tray has been loaded it has been removed by an operator to a storage truck and replaced by an empty one. In the meantime, as the extruding machine must be run constantly to prevent curing of the composition while in the extruder, there has been a great waste of extruded material during the transfer of trays and the material run during the transfer has been cut away and required remilling as illustrated by the Davis Patent No. 2,309,755.

The present invention has for an object to overcome the foregoing and other difficulties.

Other objects are to provide a plurality of coiling tables for alternate operation, to provide quick transfer of feed from one coiling table to another, to provide improved measurement of the extruded material together with automatic cutting of lengths and transfer from one coiling table to another, and generally to reduce waste and provide efficiency of procedure.

These and other objects will appear from the following description and the accompanying drawings.

Of the drawings,

Figs. 1a and 1b show, in continuation of each other a side elevation of apparatus constructed in accordance with and embodying the invention.

Fig. 2 is a plan view of that portion of the apparatus shown in Fig. 1a, parts being broken away.

Fig. 3 is a sectional view of speed control taken on line 3—3 of Fig. 2.

Figure 1A:
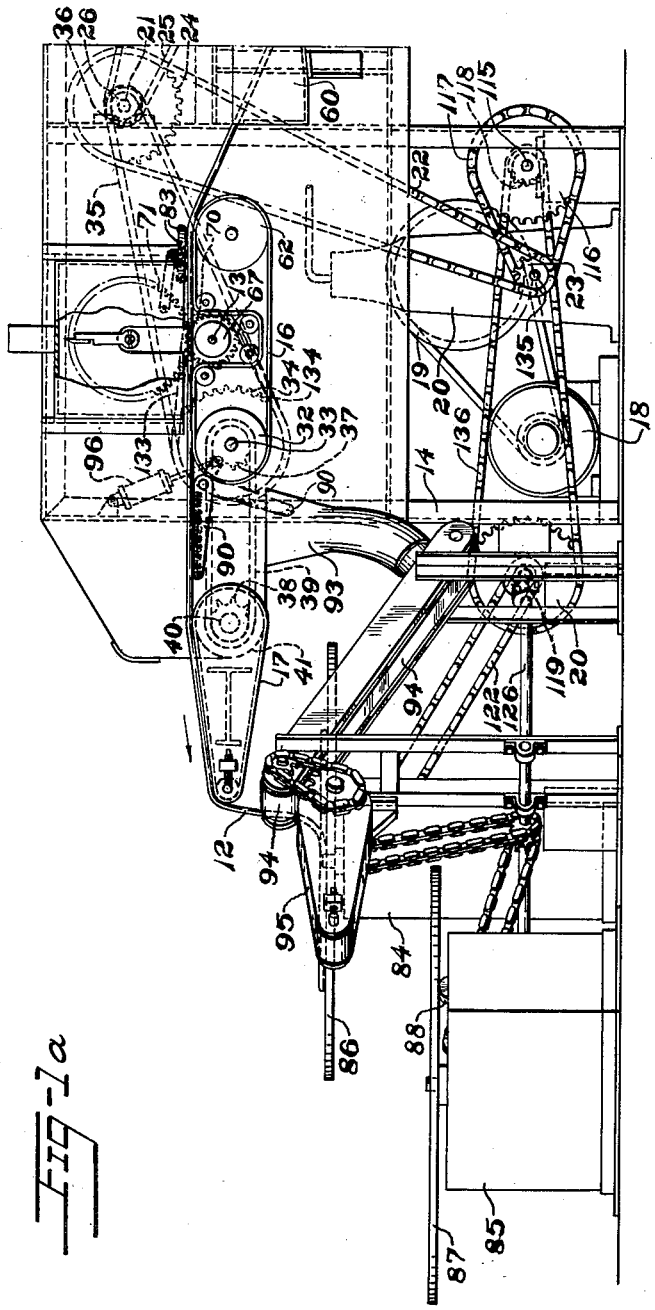

Referring to the drawings, the numeral 10 designates an extruding machine having a die 11 for forming a strip 12 of plastic rubber-like material. The strip material descends in a loop between the extruding machine and the feeding, coating and cutting apparatus which is all supported on a frame 14. For feeding the strip through this apparatus, the material is fed in turn over conveyor belts 15, 16 and 17 which are driven at the same velocity as that of the strip issuing from the extruder.

For accomplishing synchronous operation, the belts are driven from a constant speed motor 18 which through a multiple belt drive 19 drives a variable speed apparatus 20 of the multiple cone pulley or Reeves' type. The variable speed apparatus drives conveyor belt 15 through a countershaft 21 connected to the variable speed device by a driving chain 22 and sprockets 23, 24, and to the conveyor belt by a chain 25 and sprockets 26, 27. Sprocket 27 is fixed to a shaft 28 on which a pulley 29 is also fixed for driving belt 15. An idler pulley 30 on a rotatable shaft 31 supports the other end of the conveyor belt. Conveyor belt 16 is driven by a pulley 32 fixed to a shaft 33 on which a sprocket 34 is fixed. Sprocket 34 is driven by a chain 35 from a sprocket 36 fixed to shaft 21.

A sprocket 37, fixed to shaft 33 drives a sprocket 38 through a chain 39. Sprocket 38 is fixed to a shaft 40 which also has a pulley 41 fixed thereto which supports the conveyor belt 17.

The variable speed device 20 shown in Fig. 3 is controlled by pressure within a cylinder 45 which has its piston rod 46 pivotally attached to its speed changing shifter 47. A coil spring 48 is biased to the pressure exerted by the piston of the cylinder. The arrangement is such that pressure in the cylinder 45 overbalances spring pressure and decreases the speed of the conveyor belts. The cylinder 45 is supplied with compressed air through a connecting tube 44 extending from the cylinder 45 to a valve 49 on the extruding machine which is connected to a supply of air. An operating arm 50 on the valve rests upon the loop of the tube or strip 12. When the conveyors are running faster than the delivery of the extruder, the valve arm 50 on the valve rests upon the loop of the tube 12 and the valve arm 50 is raised admitting air to cylinder 45 and decreasing the speed of the conveyors. When the conveyors are running slower than the extruder, the arm is dropped, closing the valve and spring 48 increases the speed of the conveyors.

The tube passes over the conveyor belt 15 and through a tank 60 containing a dispersion of soapstone powder or other dusting material in water. A roller 61 holds the tube below the surface of the liquid so as to coat the tube.

Figure 4:
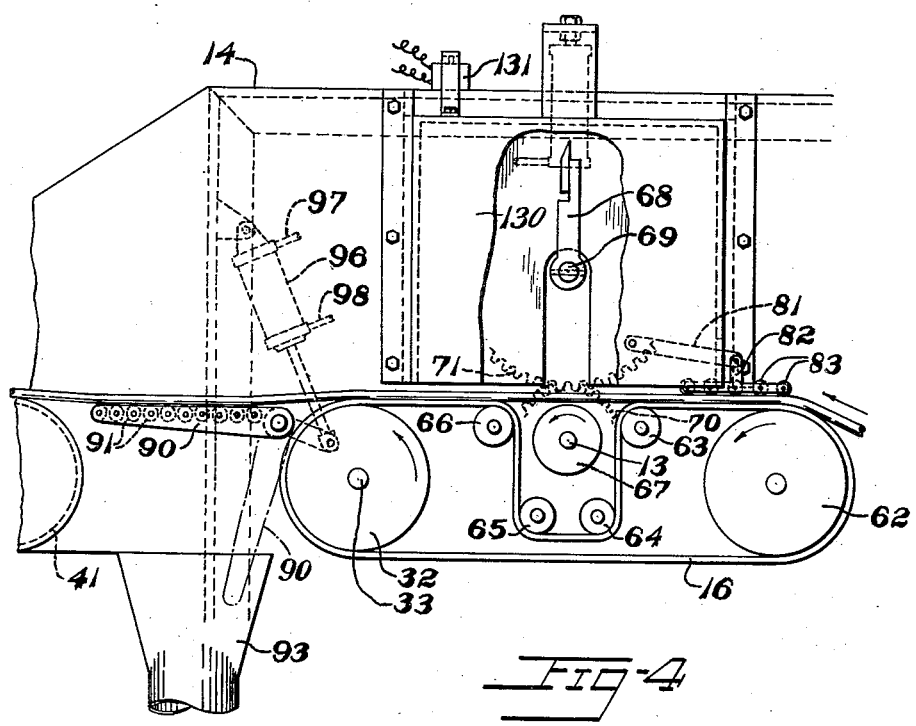
Fig. 4 is an enlarged side elevation of the cutting and feeding mechanism, parts being broken away.
Figure 5:
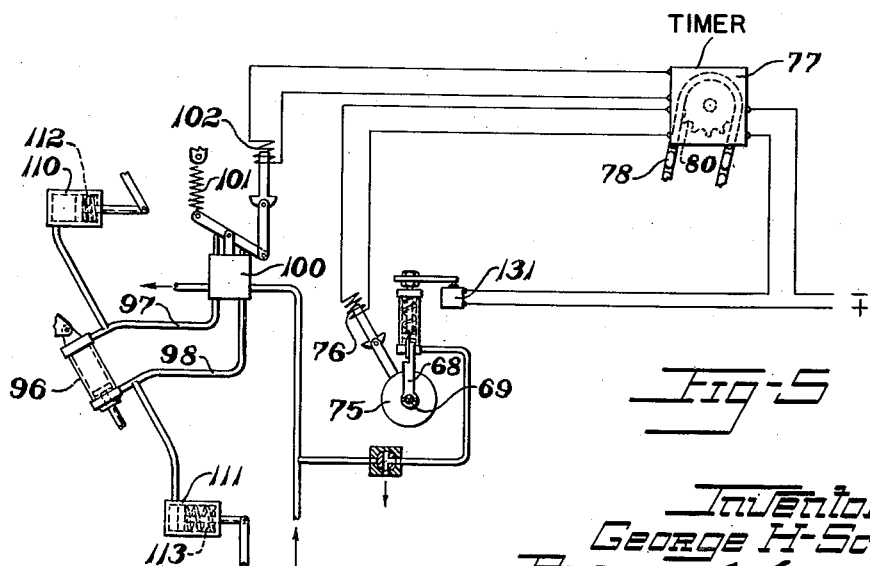
Fig. 5 is an electrical and piping diagram of the control mechanism.

The conveyor 16 (shown in Fig. 4) is trained about the pulley 32 at its delivery end and about a similar idler pulley 62 at its receiving end. The upper reach of the conveyor belt is looped downwardly about idler rollers 63, 64, 65 and 66 to clear a cutting roll 67. Cutting roller 67 is fixed to a shaft 13. Gear 70 is also fixed to shaft 13 which is driven by a sprocket 132 fixed thereto which is driven by a chain 133 from a sprocket 134 fixed to shaft 33. Above the cutting roll is a fly cutter 68 fixed to a rotatable shaft 69 and rotating in the direction of travel of the strip. A gear 71 is rotatably mounted on shaft 69 and may be driven therefrom by a single revolution clutch 75. The arrangement is such that roll 67 and shaft 69 are driven by gears 70, 71 through clutch 75 to sever the hose strip by contacting the fly cutter with the roller at the surface speed of the travelling strip. The clutch 75 is operated by a solenoid 76 controlled by a timer 77 (see Fig. 1b). The timer is driven from shaft 26 through a chain 78 and sprockets 79, 80 at the same speed as the conveyor belt 15. The timer can be set manually to sever the strip at any desired lengths. For insuring travel of the strip at the same velocity as the conveyor 15 a swinging arm 81 (see Fig. 4) is pivotally mounted on the frame and carries a weighted shoe 82 having anti-friction rollers 83 for resting on the strip.

The severed strips pass from conveyor belt 16 and are coiled upon a pair of rotatable coilers 84, 85 which support and rotate round trays 86, 87 arranged for alternate operation. Each of these coilers is of a well known type in which the disc-like tray is driven by a friction roller 88 and its axis is moved by a yankee screw 89 during rotation of the disc to lay the strip in adjacent coils. Such a coiling table is illustrated in the Davis Patent No. 2,309,755.

For feeding the cut strips in succession to alternate coilers without waste of material, a swinging trap 90 is mounted between conveyor belts 16 and 17. The trap is provided with anti-friction rollers 91 over which the strip may proceed from conveyor 16 to conveyor 17 and onto coiler 84. When the trap is dropped to the dot and dash position of Fig. 4, however, the flexible strip is fed not over conveyor 17 but through a funnel guideway 93 to a conveyor belt 94 and over a conveyor belt 95 to coiler 85.

For operating the trap 90, a double acting fluid pressure operated cylinder 96 is pivotally mounted on the frame and is connected by flexible hose 97, 98 to a four-way solenoid operated valve 100. The valve is normally held by a spring 101 in a position to deliver fluid pressure through hose 97 to the upper end of cylinder 96 and thereby to hold the trap 90 in the raised or full-line position of Fig. 4 and the hose is delivered thereacross to the conveyor 17 and coiler 84. Upon cutting of the hose to length, the trap 90 is dropped by a solenoid 102 energized by timer 77 and remains lowered until the cutter is again operated, when it returns to its raised position under influence of spring 101 reversing valve 100 and admitting fluid under pressure to the piston rod end of cylinder 96.

As the trap 90 drops, the next strip is delivered through funnel 93 to coiler 85. The coilers 84, 85 are preferably started and stopped alternately at the time of movement of the trap 90. For this purpose, single acting cylinders 110, 111 are connected respectively to lines 97, 98 and are used for engaging clutches on the coilers 84, 85, the clutches being returned by coil springs 112, 113. Suitable gearing is provided for driving the coilers 84, 85 from the speed changer 20. For this purpose a sprocket 114 on shaft 135 of the speed changer drives countershaft 115 through a sprocket 116 thereon and a chain 117. A second sprocket 118 on shaft 115 drives a countershaft 119 through a sprocket 120 thereon through chain 136. A sprocket 121 on countershaft 119 drives coiler 84 through a chain 122, sprocket 123 and clutch 124.

A shaft 126 has a bevel gear 127 thereon which is driven by a similar gear 128 on shaft 119. Shaft 126 drives coiler 85 through clutch 137.

A safety door 130 is provided in guard about the fly cutter and in the closed position thereof closes a switch 131 in the circuit which energizes the timer 77. In the open position of the door 130, the clutch solenoid 76 will remain deenergized so that the fly cutter cannot be operated.

In the operation of the apparatus strip material is extruded continuously and fed across conveyor 15, through the soapstone bath 60 to cutting conveyor 16. The timer 77 is set to measure and cut the desired lengths. The first length is delivered over the trap 90 to the conveyor 17 and onto the coiler 84. When the cut is made, coiler 84 stops, the trap 90 drops, the coiler 85 starts, the strip proceeds through funnel 93 to conveyor 94 and over conveyor 95 to coiler 85. While the coiler 84 is stopped, the operator removes the tray 86 and replaces it with an empty tray. When tray 87 is filled and the fly cutter again cuts the strip, the trap 90 is raised and the next strip is delivered to coiler 84.

Variations may be made without departing from the scope of the invention as it is defined by the following claims.

I claim.

1. Apparatus for feeding and cutting stretchable rubber strip material, said apparatus comprising a belt conveyor for supporting and advancing the strip material in a lengthwise direction, a cutter located in the path of the conveyor for cutting lengths of the material from said strip, a timer, means for driving the timer in synchronism with the speed of said conveyor, said timer being adjustable to cutting of desired lengths of material, a plurality of coiling mechanisms for receiving the cut strips of material, a trap between said conveyor and said coiling mechanisms for dropping strips without stretch and directing the strips alternately to said coiling mechanisms, means for driving said coiling mechanisms from said conveyor as the strip material is delivered thereto, and means responsive to said timer for stopping and starting said coiling mechanisms and operating said trap in synchronism with movements of said cutter.

2. Apparatus for feeding and cutting stretchable rubber strip material, said apparatus comprising a belt conveyor for supporting and advancing the stretchable strip material in a direction lengthwise thereof, a cutter located in the path of the conveyor for cutting lengths of the material from said strip, a timer, means for driving said timer in synchronism with the speed of the conveyor, said timer being adjustable to cutting of desired lengths of material, a plurality of coiling mechanisms for receiving the cut strips of material, a conveyor belt spaced longitudinally from said belt conveyor and driven thereby for delivering the cut strips to one coiling mechanism, a tiltable trap between said belt conveyor and said conveyor belt for dropping the strips without stretch for delivery to a second coiling mechanism, means for conveying the dropped strips to the second coiling mechanism, means for driving said coiling mechanisms from said belt conveyor as the strips are delivered thereto, and means responsive to said timer for starting and stopping said coiling mechanisms and operating said trap in synchronism with movements of said cutter to deliver the strips alternately to said coiling mechanisms.

3. Apparatus for feeding and cutting stretchable rubber strip material, said apparatus comprising a plurality of coiling mechanisms rotatable about fixed supports, a belt conveyor for supporting and feeding a strip of the stretchable rubber material toward said coiling mechanisms, a cutter in the path of said material for cutting determinate lengths of the material from said strip, a moveable trap in the path of travel of the strips from said cutter to said coiling mechanisms for dropping strips without stretching them and alternately directing the cut strips to said coiling mechanisms, said trap being moveable in response to movements of said cutter, and means also operable in response to movements of said cutter for effecting alternate driving of said coilers as the strip material is delivered thereto.

4. Apparatus for feeding and cutting stretchable rubber strip material, said apparatus comprising a belt conveyor for supporting and advancing the stretchable strip material, said conveyor having a downwardly looped portion between successive reaches thereof, a flying cutter located at said loop for cutting material passing between said reaches, a timer driven by said conveyor, said timer being adjustable to cutting of desired lengths from said strip, a plurality of coiling tables for receiving the cut lengths of strip material, a moveable trap located at said conveyor beyond said cutter for delivering the strips by gravity and directing the strips alternately to said coiling tables, means for driving said coiling tables in synchronism with said conveyor as the strip material is delivered thereto, and means responsive to said timer for effecting operation of said flying cutter, said trap and said coiling tables.

GEORGE H. SCHANZ.

REFERENCES CITED

The following references are of record in the file of this patent:

UNITED STATES PATENTS

| Number | Name | Date |
|---|---|---|
| 2,095,123 | Carkhuff | Oct. 5, 1937 |
| 2,126,528 | Beach | Aug. 9, 1938 |
| 2,200,656 | Schefe | May 14, 1940 |
| 2,449,234 | Knoble | Sept. 14, 1948 |